Sept. 11, 1962 K. KIRKPATRICK 3,053,551
TOWING HITCH WITH CONTROL FOR STEERING TOWED VEHICLES
Filed March 15, 1961 2 Sheets-Sheet 1
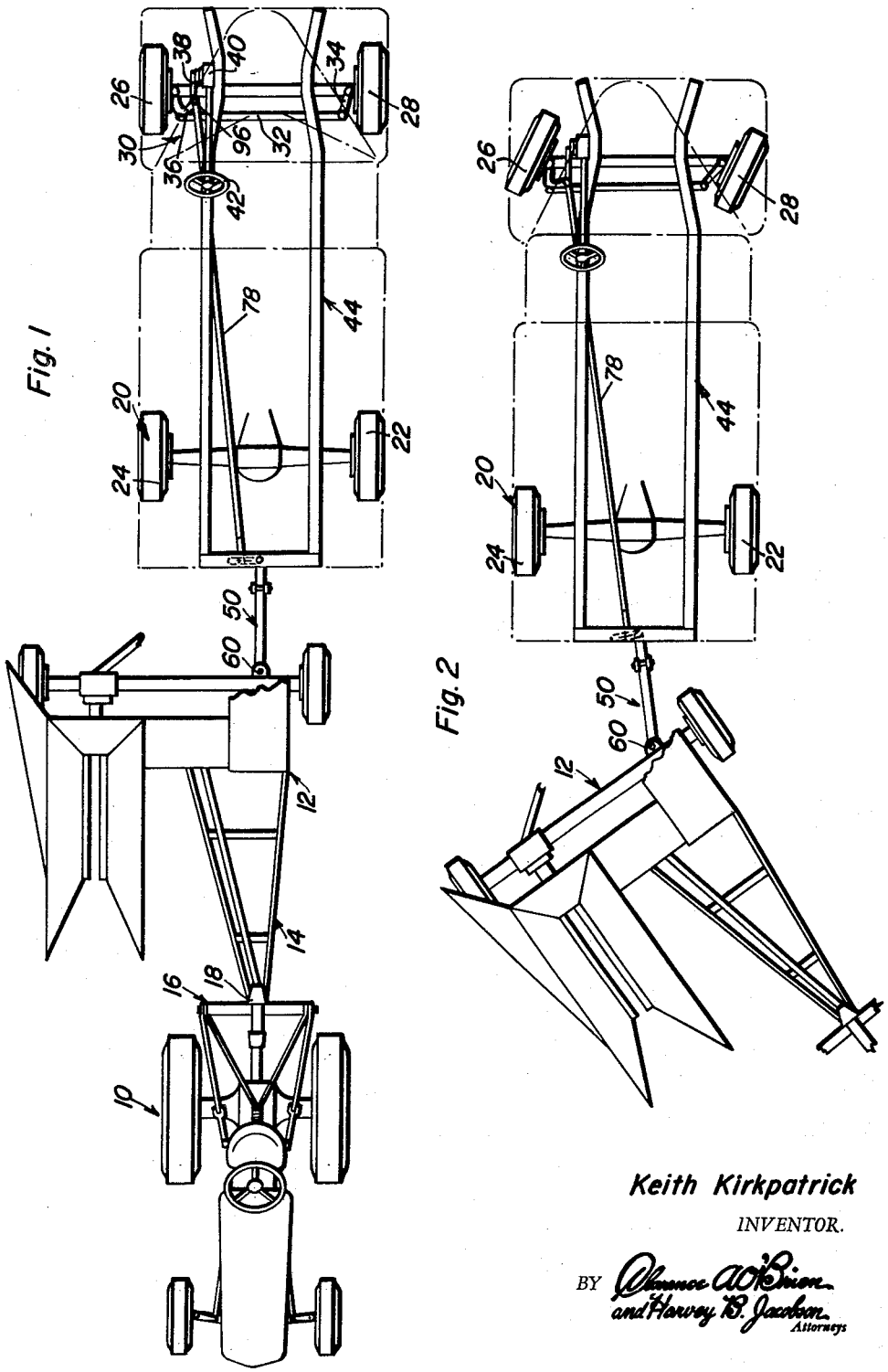
Keith Kirkpatrick
INVENTOR.

Sept. 11, 1962 K. KIRKPATRICK 3,053,551
TOWING HITCH WITH CONTROL FOR STEERING TOWED VEHICLES
Filed March 15, 1961 2 Sheets-Sheet 2
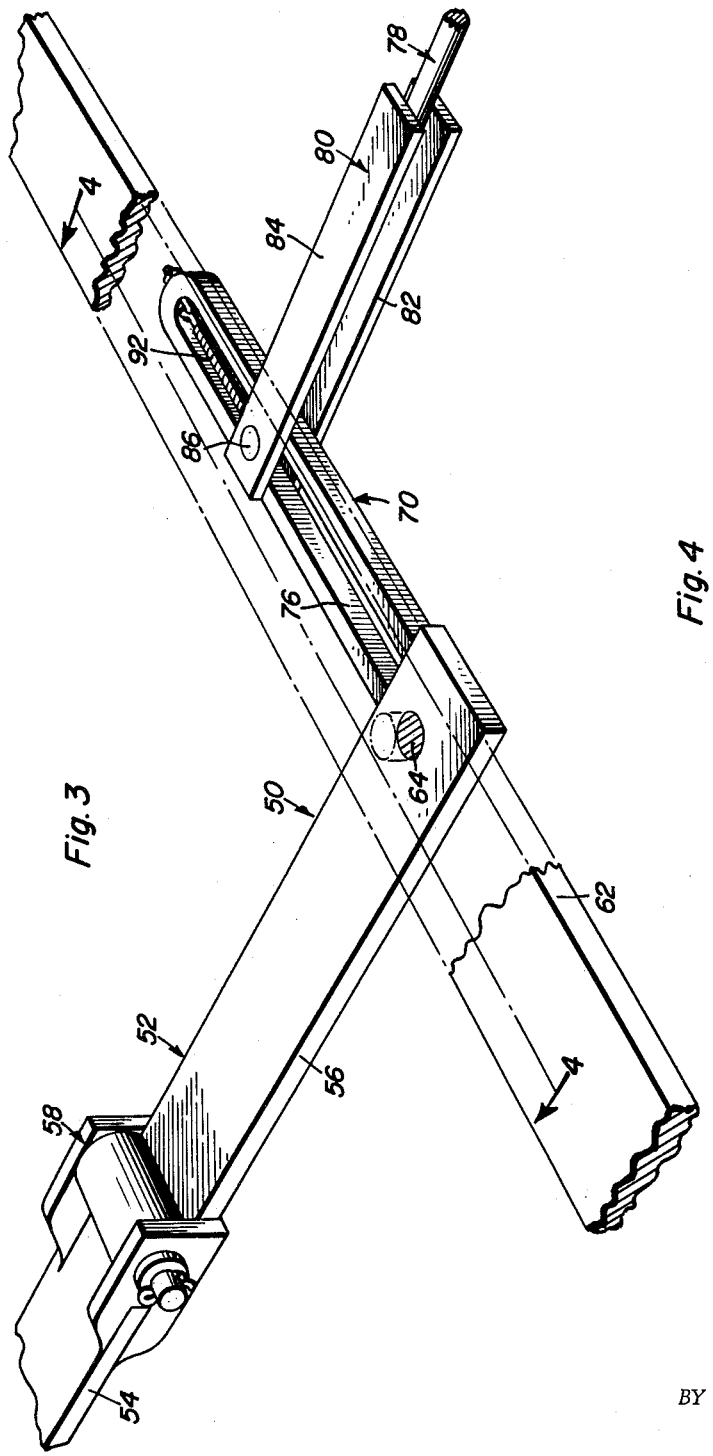
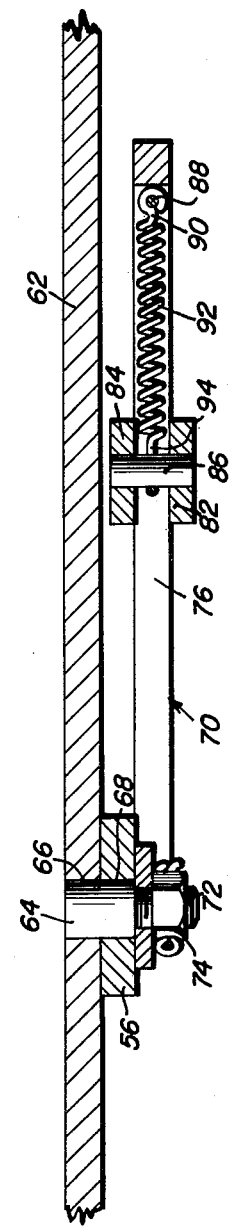
Keith Kirkpatrick
INVENTOR.

3,053,551
TOWING HITCH WITH CONTROL FOR
STEERING TOWED VEHICLES
Keith Kirkpatrick, Bucklin, Kans.
Filed Mar. 15, 1961, Ser. No. 95,902
5 Claims. (Cl. 280—444)

This invention relates to novel and useful improvements in towing hitches to be used primarily for trailing a conventional vehicle having a pair of non-steerable wheels on its rear end and a pair of steerable wheels connected to each other by steering linkage on its front end, the trailing vehicle being disposed in reverse position relative to the draft vehicle and with its steerable wheels disposed rearmost in the direction of travel.

In harvesting many crops tractors are utilized to pull trailer harvesting machinery and in some instances the harvesting equipment is provided with a discharge chute having an elevated discharge end through which the crop being harvested is discharged. In conventional practice a conventional type of truck vehicle is driven alongside the harvesting equipment with the load area of the truck disposed immediately beneath the discharge end of the discharge chute carried by the harvesting machinery whereby the truck-type vehicle may receive the crop as it is being harvested.

This conventional form of harvesting procedure requires at least one operator for the draft vehicle pulling the harvesting equipment and an operator for the truck-type vehicle into which the harvested crop is being discharged. In the past many types of towing hitches have been devised for positioning and trailing a truck-type vehicle immediately behind the harvesting machinery being trailed behind the tractor. In this manner, the truck-type vehicle is pulled along together with the tractor and harvesting equipment. In order that the truck could be steered by the operator of the tractor, suitable connecting means were secured between the tow hitch securing the forward end of the truck vehicle to the harvesting machinery and the steering linkage of the front wheels of the truck or between the steering linkage of the truck and the harvesting machinery. In this manner, pivotal movement of the harvesting machinery relative to the truck would result in the steerable front wheels of the truck being turned in a direction to trail behind the harvesting machinery while the latter was executing a turn. However, tractors and harvesting machinery trailed therebehind are capable of turning much sharper than the front wheels of a conventional truck-type vehicle are capable of turning in order to trail the truck immediately behind the tractor and harvesting machinery during a sharp turn. Accordingly, although prior methods have enabled a truck-type vehicle to be moved along with a tractor and harvesting equipment being trailed therebehind without the use of an operator in the truck in order to steer the latter, the operator of the tractor is required to make extremely wide turns in order that the truck could trail immediately behind and in the path through which the harvesting equipment being trailed by the tractor traveled. The necessity of the tractor operator having to make excessively wide turns not only resulted in loss in time but also makes it difficult for the operator of the tractor to effectively traverse the end portions of each row inasmuch as a wide sweeping turn had to be navigated at the end of each row.

A conventional type of truck vehicle cannot normally turn through an arc having a shorter radius when the truck is operated in reverse however, the forwardmost end of a truck moving in reverse does move through an arc having a shorter radius than the front end of the same truck moving forwardly.

Accordingly, it is the main object of this invention to provide a tow hitch for a conventional truck-type vehicle which will enable the latter to be pulled in reverse behind a trailing vehicle such as a piece of harvesting machinery.

A further object of this invention, in accordance with the immediately preceding object, is to provide the tow hitch with means by which the steerable front wheels disposed on the rearwardmost end of a truck being towed in reverse may be properly steered in response to pivotal movement of the draft vehicle relative to the truck in order that the forwardmost end of the truck will trail immediately behind the harvesting machinery comprising the draft vehicle even during the tightest of turns normally executed by harvesting machinery of the type being trailed behind a draft vehicle.

Still another object of this invention, in accordance with the preceding objects is to provide the means for steering the steerable wheels of a conventional truck being towed in reverse with yieldable limit means operable in response to movement of the steerable wheels of the truck to a limit position for providing a lost motion connection between the steering means and the tow hitch for operating the steering means whereby excess pivotal movement of the draft vehicle relative to the truck being trailed therebehind will be ineffective to steer the front wheels beyond the limit position.

A final object to be specifically enumerated herein is to provide a towing hitch which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference beind had to the accompanying drawings forming a part hereof, wherein like numerals refer to like parts throughout, and in which:

FIGURE 1 is a top plan view of a conventional truck-type vehicle being towed in reverse behind a piece of harvesting machinery pulled by a tractor and with the towing hitch of the instant invention being disposed between the harvesting machinery and the truck and operatively connected to the steering linkage of the truck in a manner to steer the steerable rearmost wheels of the truck in response to pivotal movement of the harvesting machinery relative to the truck, parts of the truck being shown in phantom lines;

FIGURE 2 is a top plan view similar to that of FIGURE 1 but with the tractor being removed and showing the harvesting machinery pivoted relative to the truck and the steerable wheels of the truck turned in order that the forwardmost end of the truck may trail immediately behind the turning harvesting machinery;

FIGURE 3 is a fragmentary perspective view of the towing hitch, parts thereof being broken away and shown in section; and, FIGURE 4 is a fragmentary vertical sectional view taken substantially upon the plane indicated by the section line 4—4 of FIGURE 3.

Referring now more specifically to the drawings the numeral 10 generally designates a conventional type of tractor to which there is pivotally secured a trailer type of harvesting machinery generally referred to by the reference numeral 12. The harvesting machinery 12 includes a forwardly extending boom assembly 14 which is pivotally secured to the arm lift assembly 16 of the tractor 10 as at 18 in any convenient manner. A conventional type of truck vehicle is generally referred to by the reference numeral 20 and includes a pair of non-steerable rear wheels 22 and 24 and a pair of steerable front wheels 26 and 28 which are interconnected by means of a linkage assembly generally referred to by the reference numeral 30 and including a connecting link 32 having its opposite ends pivotally secured between the free ends of the steering arms 34 and 36. The steering arm 36 is pivotally connected at its free end to the free end of a pitman arm 38 which is operatively connected to a steering gear box 40 operated by means of steering wheel 42.

The truck vehicle 20 includes a frame assembly generally referred to by the reference numeral 44 and it is to be understood that the preceding description of the tractor 10, the harvesting machinery 12 and the truck vehicle 20 are conventional.

The towing hitch of the instant invention is generally designated by the reference numeral 50 and can best be seen in detail in FIGURES 3 and 4 of the drawings. The towing hitch 50 includes a drawbar generally referred to by the reference numeral 52 which comprises opposite end sections 54 and 56.

The opposite end sections 54 and 56 are aligned and their adjacent ends are pivotally secured together for movement about a horizontal transversely extending axis by means of pivotal connection assembly 58. The forwardmost end of the end section 54 is pivotally secured to the harvesting machinery 12 for movement about an upstanding axis fixed relative to the harvesting machinery 12 as at 60 and the rear end of the end section 56 is pivotally secured to a transverse mounting bar 62 by means of pivot pin 64. The transverse mounting bar 62 is secured across the rear end of the frame assembly 44 of the truck 20 in any convenient manner and it will be noted that the pivot pin 64 is fixedly secured in an aperture 66 formed through the mounting bar 62.

The rear end of the end section 56 is provided with an aperture 68 through which the pivot pin 64 is rotatably journaled and one end of an arm member generally referred to by the reference numeral 70 is fixedly secured to the lower threaded end portion 56 of the pivot pin 64 by means of threaded fastener 74. The arm member 70 has a longitudinal slot 76 formed therein which is closed at both ends. The arm member 70 projects laterally from the end section 56 and is rigidly secured thereto in any convenient manner.

A connecting rod generally referred to by the reference numeral 78 has a bifurcated end portion 80 on its rear end including furcations 82 and 84. A slide pin 86 is disposed in the slot 76 and is secured between the free ends of the furcations 82 and 84. The outer end of the arm member 70 has a fastener 88 secured thereto having a portion thereof disposed in the outer end of the slot 76 with which one end 90 of an expansion spring 92 is engaged. The other end 94 of the expansion spring 92 is secured to the slide pin 86 and yieldably urges the slide pin 86 to the outer end portion of the slot 76.

The end of the connecting rod 78 remote from the bifurcated end portion 80 is pivotally secured as at 96 to the free end of the steering arm 36.

In operation, and assuming the towing hitch 50 is secured between the truck vehicle 20 and the harvesting machinery 12 as illustrated in FIGURE 1 of the drawings, as the harvesting machinery executes a sharp turn to the left as illustrated in FIGURE 2 of the drawings, the arm member 70 is pivoted in a counterclockwise direction as viewed in FIGURE 2 and moves the connecting rod 78 rearwardly of the truck vehicle 20 thereby effecting a rearward pull on the free end of the steering arm 36 in order to turn the steerable wheels 26 and 28 of the truck vehicle 20 as illustrated in FIGURE 2 of the drawings to swing the rearwardmost end of the truck vehicle 20 in the direction opposite to which the forward end of the harvesting machinery is swung thereby turning the truck vehicle in the same direction to which the harvesting machinery 12 is turned.

It may be appreciated from FIGURE 2 of the drawings that the steerable wheels 26 and 28 will scribe an arc having a greater radius than the arc scribed by rear wheels 22 and 24. Thus, it may be readily appreciated that the forwardmost end of the truck vehicle 20 being towed in reverse will be capable of making a sharper turn than the forwardmost end of the truck 20 would be able to turn if the truck 20 were being pulled forwardly by the harvesting machinery 12. Thus, the tractor 10 and harvesting machinery 12 may execute an extremely sharp turn without their rate of turn being greater than that being capable by the rear end of the truck vehicle 20 being pulled in reverse.

Should the harvesting machinery 12 be pivoted relative to the truck vehicle 20 an excessive amount moving the front wheels 26 and 28 of the truck to either limit position, the angle of the arm member 70 will position the innermost end of the slot 76 closer to the free end of the steering arm 36 whereby the slide pin 86 will move toward the pivot pin 64 during further movement of the free end of the arm member 70 away from the free end of the steering arm 36. By means of this lost motion connection, the effective length of the lever arm defined by the arm member 70 is decreased thereby enabling the drawbar 52 to pivot relative to the transverse mounting bar 62 an amount which would normally tend to urge the front wheels 26 and 28 to be turned beyond their limit positions. If the harvesting machinery 12 were pivoted in the opposite direction relative to the truck 20 from the position illustrated in FIGURE 2, after the limit position of the wheels 26 and 28 is reached, further pivotal movement of the harvesting machinery 12 in that direction would again result in the slide pin 86 moving through the slot 76 toward the pivot pin 64. In this manner, excess pivotal movement of the harvesting machinery 12 in either direction relative to the truck vehicle 20 may be compensated for in order to prevent the steering controls of the truck vehicle 20 from being damaged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a draft vehicle and a trailing vehicle having a pair of non-steerable wheels on its forwardmost end and a pair of steerable wheels connected to each other by steering linkage on its rearmost end, a towing hitch including a drawbar, means pivotally securing opposite ends of said bar to and between the adjacent ends of said vehicles, and steering connecting means connected between said drawbar and said steering linkage operable in response to swinging movement of the forwardmost end of said draft vehicle to one side to move said steering linkage to swing the rearmost end of said trailing vehicle to the other side, said steering connecting means including arm means carried by said one end of said drawbar and projecting laterally to one side of said drawbar, a connecting rod, means on one end of said rod pivotally connecting said one end of said connecting rod to the free end of said arm means, means pivotally securing the other end of said connecting rod to said steering linkage, said pivotal connecting means including a pin and slot connection with said free end of said arm means.

2. The combination of claim 1 wherein said drawbar comprises opposite end sections, means pivotally securing the adjacent ends of said drawbar together for movement relative to each other about a horizontally disposed axis extending transversely of said drawbar.

3. The combination of claim 1 wherein said pin and slot connection includes a longitudinal slot formed in said arm means, means yieldably urging said one end of said connecting rod to an outer end portion of said slot.

4. The combination of claim 3 wherein said pivotal securing means securing one end of said drawbar to said trailed vehicle includes means pivotally securing the adjacent ends of said drawbar together for movement relative to each other about a horizontally disposed axis extending transversely of said drawbar.

5. In combination with a draft vehicle and a trailing vehicle having a pair of non-steerable wheels on its forwardmost end and a pair of steerable wheels connected to each other by steering linkage on its rearmost end, a towing hitch including a drawbar, means pivotally securing opposite ends of said bar to and between the adjacent ends of said vehicles, and steering connecting means connected between said drawbar and said steering linkage operable in response to swinging movement of the forwardmost end of said draft vehicle to one side to move said steering linkage to swing the rearmost end of said trailing vehicle to the other side, said steering connecting means including arm means carried by said one end of said drawbar and projecting laterally to one side of said drawbar, a connecting rod, means on one end of said rod pivotally connecting said one end of said connecting rod to the free end of said arm means and slidably engaging the free end of said arm means for sliding movement longitudinally of the free end portion thereof.

References Cited in the file of this patent
UNITED STATES PATENTS

| | | |
|---|---|---|
| 2,559,487 | Whitlow | July 3, 1951 |

FOREIGN PATENTS

| | | |
|---|---|---|
| 607,293 | Great Britain | Aug. 27, 1948 |
| 919,079 | France | Nov. 18, 1946 |